US011190510B2

United States Patent
Arora et al.

(10) Patent No.: US 11,190,510 B2
(45) Date of Patent: Nov. 30, 2021

(54) TWO-FACTOR AUTHENTICATION IN A CELLULAR RADIO ACCESS NETWORK

(71) Applicant: Parallel Wireless, Inc., Nashua, NH (US)

(72) Inventors: Jitender Arora, Westford, MA (US); Yang Cao, Westford, MA (US); Steven Paul Papa, Windham, NH (US)

(73) Assignee: Parallel Wireless, Inc., Nashua, NH (US)

( * ) Notice: Subject to any disclaimer, the term of this patent is extended or adjusted under 35 U.S.C. 154(b) by 82 days.

(21) Appl. No.: 16/192,794

(22) Filed: Nov. 15, 2018

(65) Prior Publication Data
US 2019/0149545 A1 May 16, 2019

Related U.S. Application Data

(60) Provisional application No. 62/586,334, filed on Nov. 15, 2017.

(51) Int. Cl.
*G06F 21/00* (2013.01)
*H04L 29/06* (2006.01)
(Continued)

(52) U.S. Cl.
CPC ........ *H04L 63/0884* (2013.01); *H04L 9/0861* (2013.01); *H04L 9/3271* (2013.01);
(Continued)

(58) Field of Classification Search
CPC ... H04W 12/06; H04W 72/042; H04W 60/00; H04W 48/18; H04W 76/27; H04W 48/02;
(Continued)

(56) References Cited

U.S. PATENT DOCUMENTS

| | | | |
|---|---|---|---|
| 7,272,379 B1 * | 9/2007 | Tang | H04M 15/00 455/405 |
| 2006/0050680 A1 * | 3/2006 | Naim | H04L 63/08 370/352 |

(Continued)

FOREIGN PATENT DOCUMENTS

WO 2015199241 A1 12/2015

OTHER PUBLICATIONS

PCT International Search Report for PCT/US2017/054639. Published Jan. 19, 2018. World Intellectual Property Organization (WIPO).

(Continued)

*Primary Examiner* — Ghazal B Shehni
(74) *Attorney, Agent, or Firm* — Michael Y. Saji; David W. Rouille

(57) ABSTRACT

A method for authenticating radio access network devices is disclosed, comprising: authenticating, at a coordination server, a base station in a radio access network using a first authentication factor; selecting, following successful authentication of the base station using the first authentication factor, a challenge question based on historical information of the base station stored within a database; sending, from the coordination server to the base station, a request containing the challenge question to further authenticate the base station based on the historical information of the base station; receiving, from the base station at the coordination server, a response to the challenge question; verifying, at the coordination server, the correctness of the response using a key derived from the historical information; and granting the base station access to a core network of a mobile operator, thereby addressing security issues unsolved by one-factor authentication.

7 Claims, 10 Drawing Sheets

(51) Int. Cl.
 H04W 48/02 (2009.01)
 H04W 12/06 (2021.01)
 H04L 9/32 (2006.01)
 H04L 9/08 (2006.01)
 H04W 84/04 (2009.01)

(52) U.S. Cl.
 CPC ........... H04W 12/06 (2013.01); H04W 48/02 (2013.01); *H04L 2463/082* (2013.01); *H04W 84/042* (2013.01)

(58) Field of Classification Search
 CPC ............... H04W 84/042; H04L 9/0861; H04L 63/0884; H04L 9/3271; H04L 2463/082
 See application file for complete search history.

(56) References Cited

U.S. PATENT DOCUMENTS

| | | |
|---|---|---|
| 2007/0250713 A1 | 10/2007 | Rahman et al. |
| 2012/0011574 A1* | 1/2012 | Holtmanns ..... H04W 12/04031 726/4 |
| 2012/0163336 A1 | 6/2012 | Adjakple et al. |
| 2012/0167177 A1* | 6/2012 | Sonntag ................ H04L 69/28 726/3 |
| 2013/0007858 A1* | 1/2013 | Shah .................... H04W 12/04 726/6 |
| 2014/0130155 A1 | 5/2014 | An et al. |
| 2015/0257051 A1 | 9/2015 | Rao et al. |
| 2016/0142944 A1 | 5/2016 | Cao |
| 2018/0062847 A1* | 3/2018 | Mildh .................. H04W 12/10 |

OTHER PUBLICATIONS

Peng Wang and Xiaojuan Zhang. "Local Gateway Assisted Handover Key Derivation in Enterprise Femtocell Network." Int. J. Communications, Network and System Sciences, 2015, 8, 70-78. Published online Apr. 2015 in SciRes. http://dx.doi.org/10.4236/ijcns.2015.84009.

3rd Generation Partnership Project. 3GPP TS 33.401: Technical Specification Group Services and System Aspects; 3GPP System Architecture Evolution (SAE); Security architecture (Release 9). Version 9.8.0. Sep. 2015.

* cited by examiner

TWO-FACTOR AUTHENTICATION IN A CELLULAR RADIO ACCESS NETWORK

CROSS-REFERENCE TO RELATED APPLICATIONS

This application claims the benefit of priority under 37 C.F.R. § 119 to U.S. Provisional Pat. App. No. 62/586,334, titled "Two-Factor Authentication in a Cellular Radio Access Network," filed Nov. 15, 2017, which is also hereby incorporated by reference in its entirety for all purposes. In addition, this application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289, 821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015, each in its entirety for all purposes. This document also hereby incorporates by reference U.S. Pat. Nos. 9,107,092, 8,867,418, and 923,547 in their entirety. This document also hereby incorporates by reference U.S. patent application Ser. No. 14/822,839 in its entirety. This document also hereby incorporates by reference Chan A. C F., Wong J. W., Zhou J., Teo J. (2016) Scalable Two-Factor Authentication Using Historical Data. In: Askoxylakis I., Ioannidis S., Katsikas S., Meadows C. (eds) Computer Security—ESORICS 2016. ESORICS 2016. Lecture Notes in Computer Science, vol 9878. Springer, Cham in its entirety for all purposes.

BACKGROUND

To authenticate a user or a network device attempting to access various resources or services from the network, currently such a user or a network device is authenticated using one-factor authentication e.g. user and password. The exchange of user and password may be encrypted to maintain secrecy. However, if a rogue network device or a user somehow gets access to the user and password and secret keys used for encryption, such a rogue device or user may be able to access the network resources and could cause harm to the network and other network devices. One-factor authentication therefore poses a risk to the network security.

Two-factor authentication for a machine-to-machine communication is currently achieved with the use of smartcard. Two-factor authentication in a machine-to-machine communication with Internet-of-Thing (IoT) devices based on the past communication is proposed. However, using past communication the IoT devices is relatively simple because IoT device will generally connect to limited number of network servers and so the IoT device has to challenge only limited number of servers about past communications with the IoT device. In addition, IoT devices has very small memory footprint and therefore the past communication the IoT device may use to challenge is very limited. No such two-factor authentication process exists in the case of mobile or wireless networks where base stations, NodeBs, eNodeBs, HeNBs in the radio network are attempting to resources in the core network and are granted access after successful one-factor authentication.

SUMMARY

In a first embodiment, a method for authenticating radio access network devices is disclosed, comprising: authenticating, at a coordination server, a base station in a radio access network using a first authentication factor; selecting, following successful authentication of the base station using the first authentication factor, a challenge question based on historical information of the base station stored within a database; sending, from the coordination server to the base station, a request containing the challenge question to further authenticate the base station based on the historical information of the base station; receiving, from the base station at the coordination server, a response to the challenge question; verifying, at the coordination server, the correctness of the response using a key derived from the historical information; and granting the base station access to a core network of a mobile operator, thereby addressing security issues unsolved by one-factor authentication.

The historical information may be based on a plurality of events that have occurred at the base station. The historical information further comprises a base station identifier, a timestamp, and an event type The historical information may be based on a user equipment (UE) attach event. The challenge question may be based on a key derived from the historical information. The method may further comprise receiving an index of the historical information at the coordination server from a database server. The method may further comprise forwarding, from the coordination server, the historical information to a database server. The method may further comprise, at the base station, using an index of the historical information and a local copy of the historical information to derive a secret key at the base station.

In a second embodiment, a non-transitory computer-readable medium which, when executed by a processor at a server, causes the server to perform: authenticating, at a coordination server, a base station in a radio access network using a first authentication factor; selecting, following successful authentication of the base station using the first authentication factor, a challenge question based on historical information of the base station stored within a database; sending, from the coordination server to the base station, a request containing the challenge question to further authenticate the base station based on the historical information of the base station; receiving, from the base station at the coordination server, a response to the challenge question; verifying, at the coordination server, the correctness of the response using a key derived from the historical information; and granting the base station access to a core network of a mobile operator, thereby addressing security issues unsolved by one-factor authentication.

DETAILED DESCRIPTION

Figure 1:
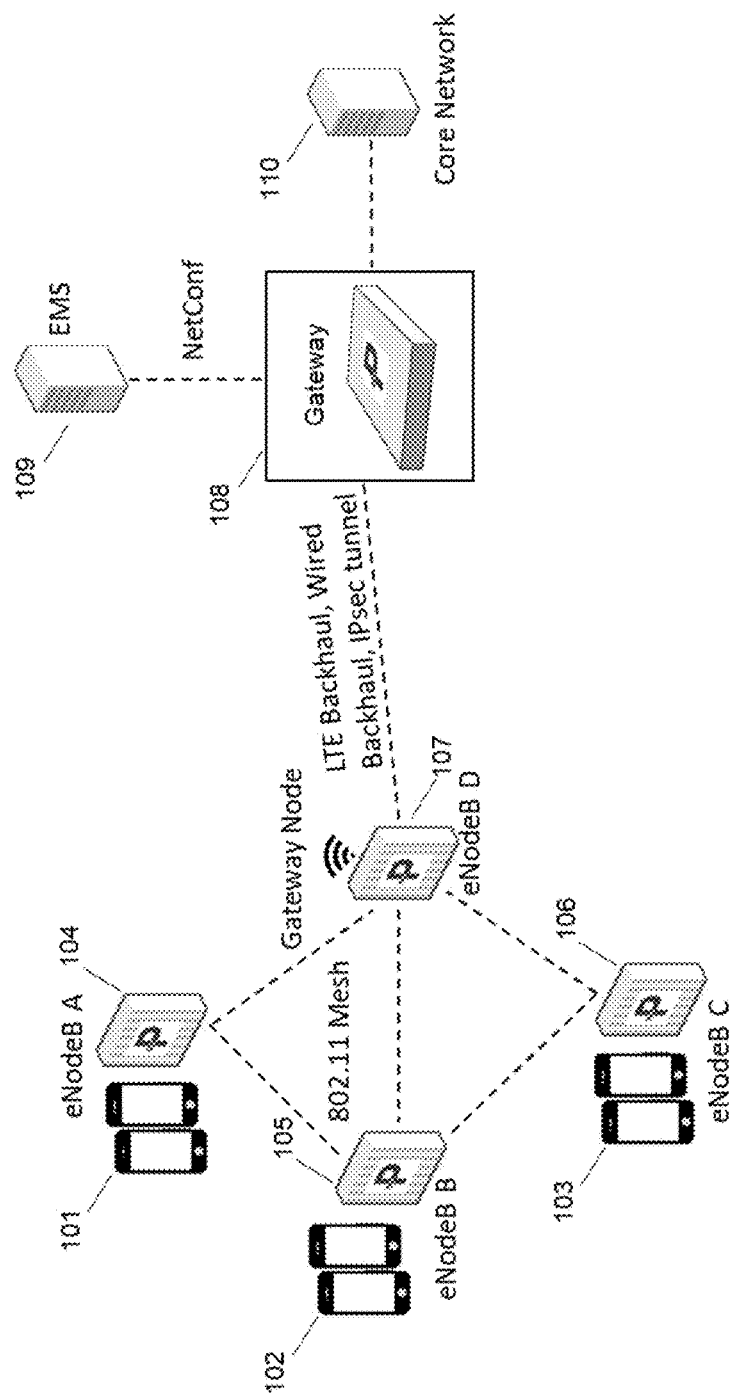
FIG. 1 shows a typical environment in which the proposed two-factor authentication process may be deployed, in some embodiments.

The goal of the present disclosure is to improve the security and grant access only to the right device, in addition to existing security tokens, an additional challenge is posed to the device seeking access. Typically, with two-factor authentication, a user is asked to answer the additional challenge based on the information only a true user will know e.g. the user is sent a code to his/her registered phone number or an email address with the service provider; the user is asked to answer the security challenge that the user has provided at the time of creating a profile with the correct answer; the user's fingerprint or other biometric information or behavioral analytics; or historical or recent transaction the user had for the service, for example, accessing a bank account online, the last deposit or withdrawal the user made. Creating a two-factor authentication token using communication history data is the disclosed solution. The communication history data is an ever evolving data and so difficult to get the full challenge response by a rogue device. The attacker will only be holding a diminishing amount of data only as the data keeps growing with time as new events keeps added constantly to the subset of historical data to verify. The assumption being made here is that for a rogue device or an attacker does not have the entire or substantial percentage of the communication history without being detected for that long to collect the entire or substantial percentage of history forming the challenge response. Therefore, the likelihood of successful attack by a rogue device reduces exponentially as the communication history develops over time.

This additional level of security through two-factor authentication works well when a human being is involved. In a machine to machine environment such as radio access network, mobile operator's core network, power grid, transportation system, two-factor authentication is difficult yet needed. Cyber attacks on devices with easy to use username/password combinations creates huge risks to organizations and individual privacy. The spread of open-source software and advancement in the hardware and integrated circuit technology available at a low price, an LTE eNodeB or a femto base station can be developed with malware to attack the mobile operator's core network using one-factor authentication if username/password and/or encryption key are leaked.

Two-factor authentication for machine-to-machine communication is currently achieved with the use of smartcard. With a network device, two-factor authentication uses the conventional user-name/password or pre-shared keys (PSKs) and a history of the data exchanged between the IoT and the Server, from a subset up to the whole history of generated data. Algorithm generates and stores in the device secret information requiring small and fixed memory access on the device for a second level of authentication. The secret information is something known only to the privileged device for example history of the communication the device had in lieu of what they know or possess that works when a human being is involved.

The secret information may represents the entire or substantial percentage, or a part, of the communication history between the device and the Server. The two-factor authentication by device is simple in operation as device is connected to the Server only and authenticating the Server only. The assumption being made here is that for a rogue device or an attacker does not have the entire or substantial percentage of the communication history without being detected for that long to collect the entire or substantial percentage of history forming the challenge response.

The device acting as an authenticator or verifier can selects only a finite historical data, a subset of evolving historical data, or all historical data in a time window, for two-factor authentication. The device converts selected finite historical data into tags through a security function and communicates the selected finite historical data and tags associated to an indices to the Server as items selected by the authenticator to authenticate the Server. During the authentication, after a successful one-factor authentication using user-name/password, the device challenge the Server in the form of a random subset of indices of the set of tags. The Server responds with an answer by running a function to show that it knows the historical data associated with those tags at the random subset of indices in the challenge question, and the verifier verifies response running a different function to get the actual data at the indices in the challenge question.

The solution to use two-factor authentication in a mobile network or radio access network is not common, where the amount of communication history among the various elements of the network is constant and covers a very broad subject matter types. In some embodiments the verifying to proving network element ratio is 1 to N, i.e. one network element (e.g. coordinating server) is authenticating multiple network elements (e.g. eNodeBs, base stations) In some embodiments the attacker needs to steal hundreds of gigabytes and not just a few user-name/password or secret keys because the second authentication factor is constantly evolving communication data.

In some embodiments, the present disclosure has the following characteristics. Even though, the second authentication factor is constantly evolving communication data, the solution only requires a constant/fixed amount of storage, making access and processing efficient and faster. The solution is different from other multi-factor authentication, that is based on generally, what you know, what you have, and what you are, whom you know, or where you are. The solution is based what has been communicated so far between the two network nodes. The verification is done periodically as configured by an radio access network or mobile network operator.

Generally, the present disclosure reflects emerging ideas about the use of big data and analytics that have been appreciated by the inventors. Any data store could be used to provide the underlying data for hashing. This is helpful as such data is often already collected for purposes of enabling KPIs, etc. A "big data" data store, collecting information over a plurality of RANs, could be provided. Such a database could be located at the core network, including at an HNG, CN GW, etc. A mesh network base station gateway could use data from a plurality of RANs for performing this method. When data from >1 RAN is used, authentication could be performed at a gateway that is configured to collect the data. Or, the data could be actively shared among the nodes in the mesh in order to enable authentication. Machine learning could be used to: Determine which historical entries to use; and/or Compare similarity of two sets of historical data (this is an alternative to the hash approach).

Use cases include: enterprise small cells; first responder small cells; IoT devices, IoT small cells; and any device that needs to be transitioned from 1-factor to 2-factor authentication, including any insecure or vulnerable device broadly, which should be authenticated periodically.

Security issues with rogue eNodeBs may be resolved using the present disclosure.

OpenBTS, third party etc. eNBs may not be secured and may be secured using the present disclosure. Femto eNBs are physically located in user/customer premises and are vulnerable to tampering; IMSI catcher, IMSI broadcast cause risks to infrastructure and users; shared datacenter/virtualized core network nodes are also vulnerable; these may all be secured using the present disclosure.

Method of Two-Factor Authentication

In some embodiments, the process may be defined in the four phases: 1. init; 2. tag; 3. proving and verifying; and 4. two-party interactive protocol. The process with reference to the coordinating server and a single base station only for simplicity. The process actually occurs in reference to the coordinating server and multiple base stations. The process may also occur with reference to a base station and multiple other base stations or core network elements. The coordinating server maintains the history of all communications with all base stations (or other authenticatees).

In the init ($1^\lambda$) Phase, the following occurs. Generating pair of secret keys (sk1, sk2) using randomized algorithms occurs. Secret key sk1 is known to both verifying network element (e.g. coordinating server) and the proving network element (e.g. base station, eNodeB, NodeB etc.). Secret key sk2 is known only to the verifying network element (e.g. coordinating server) and used by the coordinating server to tag the historical data D to generate the second authentication factor D* for the base station. In reality, sk1=mk and sk2=(K,K')

In the tag (sk2, di) Phase, the coordinating server tags each piece of data di∈D to with sk2 as the key and generates a tag ti.

The coordinating server sends (di, ti) to the base station. In reality, (di, ti)∈D*

In the proving and Verifying (AuthP(sk1, D*), AuthV (sk1,sk2)) phase, randomized algorithms are used to authenticate base stations at the coordinating server. The proving and verifying step includes the following.

The coordinating server selects random challenges and a set I of indices corresponding to t pieces of historical data D to request a response from the base station. The base station uses {(di,ti)∈D*:i∈I} and sk1 to generate the response. The coordinating server verifies the response. In reality, {0,1}← (AuthV (sk1,sk2)⇋AuthP(sk1, D*)). The successful verification depends on for all λ and some data set D, if (sk1, sk2)←Init(1λ), and D*={(di,ti): di∈D} where ti←Tag(sk2, di),∀di∈D, then the output b of the protocol (AuthV (sk1, sk2)⇋AuthP(sk1, D*), with all messages delivered correctly between the base station and the coordinating server, will be 1 except for negligible probability.

How the Solution Defends Against Adversarial Attack. Assuming that a rogue base station A' wants to impersonate as a genuine eNodeB A to cause disruptions in the radio access network. Further assumptions are made that A' is unable to gain access to both secret keys (sk1,sk2) generated by the coordinating server. Additionally A' has not fully compromised A i.e. A' is unable to get full D*. Adversary A' however has access or control of the signaling and communication path to the coordinating server and is able to send (inject), modify, delete, snoop messages exchanged between eNodeB A and the coordinating server. A' capability to snoop on the traffic between A and the coordinating server may result in to A' having access to some of the historical data being used for verification of A at the coordinating server. However, A' is unable to get access to the full historical data, and so successfully authenticate itself as A to the coordinating server.

The method is a 2-step challenge-response with a goal that a true eNodeB is able to verify its identity by possession of sk1 and D*. The method may include to all historical events for tagging for use in verification. Alternatively, historical events are tagged randomly for use in verification. Alternatively, historical events can be tagged using any other function. For example, tag all; tag a % by round robin; tag based on a selector, filter, or search; tag based on a time window; tag based on a combination of any of the functions described herein.

In some embodiments, during initialization phase, for a security parameter λ,

Randomly choose secret key mk∈{0, 1} λ and set sk1=mk

Randomly choose two secret keys K∈F*, K'∈{0,1}* and sk2=(K, K') where F is a pseudorandom function of {0, 1} λx {0, 1}* with λ-bit key and an arbitrary length string output.

Load sk1=mk to the base station and (sk1,sk2)=(mk, K, K') to the coordinating server During Tag Generation/Tagging phase, at the coordinating server Public and private key (K, K') of the second secret key sk2 are retrieved.

New segment key ki for i is generated as ki=fk'(i) and compute the tag ti=K·h(di)+ki The coordinating server sends tuple (i, di, ti) to the eNodeB where i represents indices of the data selected for verification through 2-stage authentication. The eNodeB receiving tuple from the coordinating server will store (di, ti) to D* and increases the index according to i as received from the coordinating server.

In some embodiments, during Tag Generation/Tagging phase, at the coordinating server, Public and private key (K, K') of the second secret key sk2 are retrieved.

New segment key ki for i is generated as ki=fk'(i) and compute the tagti=K·h(di)+ki The coordinating server sends tuple (i, di, ti) to the eNodeB where i represents indices of the data selected for verification through 2-stage authentication The eNodeB receiving tuple from the coordinating server will store (di, ti) to D* and increases the index according to i as received from the coordinating server In alternate embodiments, the coordinating server may only send the indices i used to store the historical event at the database at the coordinating server and a timestamp at which the event occurred to the base station. The base station then has to store the event it reported at the timestamp along with indices i received from the coordinating server, for future two-factor authentication. No underlying historical data is sent during authentication, only during the prior tagging phase.

In some embodiments, during authentication stage, after 1-stage authentication is successful between the coordinating server and eNodeB, the coordinating server may choose to authenticate eNodeB based on the historical data randomly, or periodically and performs the following tasks:

The coordinating server randomly chooses set I oft available indices

The coordinating server also picks a random bit-string r∈{0, 1} λ and sends challenge C to the eNodeB where C=(I, r)

Upon receipt of the challenge, the eNodeB produces response R using sk1 and D* as follows:
(a) On r, use mk to compute r'=Emk(r).
(b) On I, for each i∈I, retrieve (di, ti)∈D* and compute $X = \Sigma i \in I\, fr'(i) \cdot h(di),$ $Y = \Sigma i \in I\, fr'(i) \cdot ti.$ (c) eNodeB then sends the response R(C)=(X, Y) to the coordinating server.

At the coordinating server,

Upon receipt of the response R'=(X', Y'), the coordinating server uses sk1=mk and sk2=(K, K') to verify as follows
(a) Use mk to compute r'=Emk(r).
(b) Compute KI=ΣiEI fK'(i)·fr' (i)
(c) Check Y' ?=KI+K·X'. If yes, return 1, otherwise, return 0.

The solution provides benefits against adversarial attack as the adversary can not obtain substantial amount of the historical dataset e.g. more than 50%.

How does this fit in to the general authentication process? Upon power-on, CWS (the RAN) sets up an initial IPsec tunnel with certificate-based authentication. We propose this solution for providing subsequent authentications in a lightweight, transactional way. By enabling CWS to save certain historical events and discard others, this can be made more lightweight.

Hardware

Through its HetNet Gateway (HNG) (TM), the Parallel Wireless solution can orchestrate and manage the Radio Access Network (RAN) across multiple technologies, including 3G, 4G and Wi-Fi, with high ease of use. The centerpiece of the Parallel Wireless solution is the HetNet Gateway, which is the wireless industry's first carrier-grade, high-performance RAN orchestrator that is based on software-defined networking (SDN) and network functions virtualization (NFV), and is 100 percent compliant with all open and standard interfaces as defined by the 3rd Generation Partnership Project (3GPP). The Parallel Wireless HNG virtualizes the RAN interfaces to manage the 4G and 3G (Long Term Evolution, or LTE, and universal mobile telecommunications system, or UMTS) RANs (HomeNodeBs/NodeBs and eNodeBs/HeNodeBs) in real-time via multi-technology self-organizing network (SON) and gateway functionality while abstracting RAN changes from the core network and the core network itself from the RAN. The Parallel Wireless HNG virtualizes thousands of base stations to look like a smaller number of virtualized "boomer cells" to the core. The Parallel Wireless HNG also virtualizes radio network nodes such as Wi-Fi access points (APs), eNodeBs and NodeBs and makes them self-configurable, self-adjustable, and self-healing, helping with initial installation and ongoing maintenance. The Parallel Wireless HNG acts like a virtual radio network controller (vRNC or virtual RNC) for multi-RAT network handling resources for different technologies 3G, LTE/4G and WiFi while optimizing call processing towards radio and core network elements such as the mobile switching center (MSC), serving global packet radio system (GPRS) support node (SGSN), gateway GPRS support node (GGSN), evolved packet core (EPC) for 4G, home subscriber server (HSS), and policy charging and rules function (PCRF).

Paired with the Parallel Wireless HNG, the Parallel Wireless base station, the Converged Wireless System (CWS) (TM), is a multi-RAT base station with LTE, Wi-Fi, and 3G technologies that provides a flexible outdoor and in-vehicle solution in conjunction with the Parallel Wireless HNG. The combined system is a cloud-based network orchestration system that maximizes virtualization, and functions in a 3GPP standards-based Heterogeneous Network (HetNet) to bring 3G, Wi-Fi and 4G operators better technology at lower cost. The Parallel Wireless solution addresses key challenges in delivering 3G/4G coverage, capacity, and quality of service (QoS), regardless of the cell size, e.g., femtocell, pico cell, micro cell, metro cell, or macro cell. The Parallel Wireless solution is also easy to deploy with automated configuration and ongoing optimization.

In some embodiments, a base station, also known as an Access Cell or radio access network (RAN), within a Distributed Virtualized Radio Access Network (RAN), may be positioned in geographically dispersed locations. Transport of data from the Access Cell to an operator's network may traverse unsecure networks. Encrypted tunnels are required between the Access Cell and the Security Gateway (SeGW) which acts as a entry point to the operator's network. Authentication and authorization of said Access Cells can be implemented via the use of Digital Certificates and a Public Key Infrastructure (PKI) system. The PKI system provides for PKI certificate exchange and management during a startup or bootstrapping phase of a base station. The base station may be a 2G, 3G, 4G, LTE, or other base station that is designed to use IPsec to communicate with a remote core network or operator network. The base station may be located behind a security gateway proxy, the security gateway proxy being in communication with an operator certificate server, which may be a PKI root authority or certificate authority.

Environment

FIG. 1 shows a typical environment in which the proposed two-factor authentication process may be deployed, in some embodiments. Base stations, eNodeB-A 104, eNodeB-B 105, eNodeB-C 106, and eNodeB-D 107 are connected to each other over mesh network link and base station 107 provides connectivity to a mobile operator's core network through a wired backhaul or wireless backhaul system. The base station 107 also provides a secure connection to a coordinating server 108 over IPSec tunnel. The Coordinating server 108 may also be known as gateway 108. The coordinating server 108 is connected to EMS 109 over NetConf interface. The EMS 109 provides operations and administration management (OAM) services to the coordinating server 108. The OAM services may also be provided using simple network management protocol (SNMP). The coordinating server 108 provides connectivity to user equipments 101, 102, 103 camped on to base stations 104, 105, 106 to a mobile operator's core network 110.

Process Flow Chart

Figure 2:
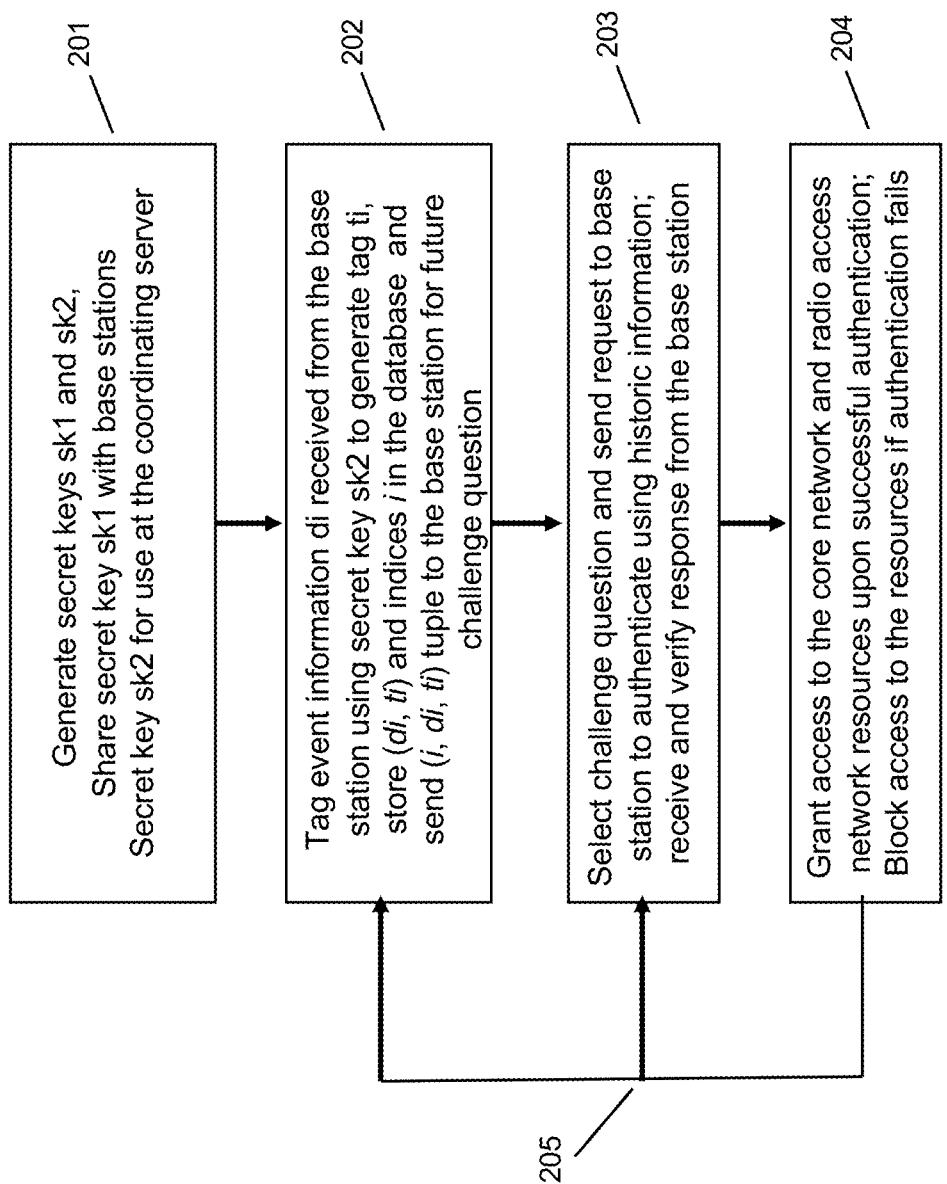
FIG. 2 shows a flowchart depicting a process or sequence of steps for two-factor authentication of the base station, in accordance with some embodiments.

FIG. 2 shows a flowchart depicting a process or sequence of steps for two-factor authentication of the base station, in accordance with some embodiments. Different phases of the process are: initialization 201, tagging information for future challenge questions 202, sending a request with a challenge question and processing a response message 203, and granting an access to core network and radio access network resources 204 in accordance with some embodiments.

In Initialization Phase 201, A pair of secret keys, sk1 and sk2, are generated using a random algorithm. The algorithm may be based on either symmetric key algorithms or public key algorithms, e.g. AES, DES, RSA etc. The keys may also be generated using randomly generated keys e.g. random number generator or pseudorandom number generator. The key sk1 is known to both the base station as well as the coordination server, whereas the key sk2 is known only to the coordination server. The key sk2 is used by the coordination server to tag any historical information from the categories listed above to use in the challenge question, whereas the sk1 is used by the base station while responding to the challenge question.

In Tagging Phase 202, the coordination server starts building a database of historical information upon occurrence and reporting of an event from the categories listed above either at the base station or at the coordinating server. The coordination server select data di to generate tag ti by encrypting with the secret key sk2. The coordination server may further send the pair of di and ti to the base station using X2 protocol, such that the base station may store the received pair of di and ti in a local storage at the base station. The local storage at the base station may be an in-memory database, a persistent file system, a flash-drive attached to the base station, or an SD card. Any technique known in the field to store and retrieve data may be used. The pair of di and ti may be removed if it is older than a predefined period. The predefined period may be mutually selected or selected by the coordination server alone. Alternatively, the coordination server may decide to keep only last n number of historical data, thereby reducing the amount of memory needed for storage and for faster search and verification process execution.

In Challenge and Response Processing stage 203, the coordination server may select a challenge question based on a plurality of historical information that has been stored as the tag ti and associated with the data di and a set of indices. The coordination server challenges the base station for historical information associated with the set of indices. The base station upon receipt of the challenge, retrieves stored pair of di and ti associated with the set the set of indices, generates challenge response using secret key sk1 back to the coordination server. The coordination server verifies the response to the expected and preselected tags for the challenge request message.

In Blocking Access stage 204, when authentication of the base station using historic information fails, the coordination server may block further requests for accessing the resources in the radio access network or the core network of the mobile operators. The blocking may be for a limited period that is the base station that failed the two-factor authentication is placed in a blacklist for a limited period and could be white listed only after an operator's manual intervention. The base station in the blacklist may be whitelisted upon subsequent successful response to the challenge question. The coordination server may set a timer to send the next challenge question for authentication. The timer may be preselected default value or may be randomly set within a preselected minimum and maximum threshold interval.

At Continue 205, the coordination server may set a timer to send the next challenge question for authentication. The timer may be preselected default value or may be randomly set within a preselected minimum and maximum threshold interval. If new historical event occurs between the last authentication based on historical information, the coordinating server may follow steps mentioned in tagging phase 202. If no new historical event occurred between the last authentication based on historical information, the coordinating server may authenticate the base station following steps detailed in challenge and response processing phase 203.

Figure 3A:
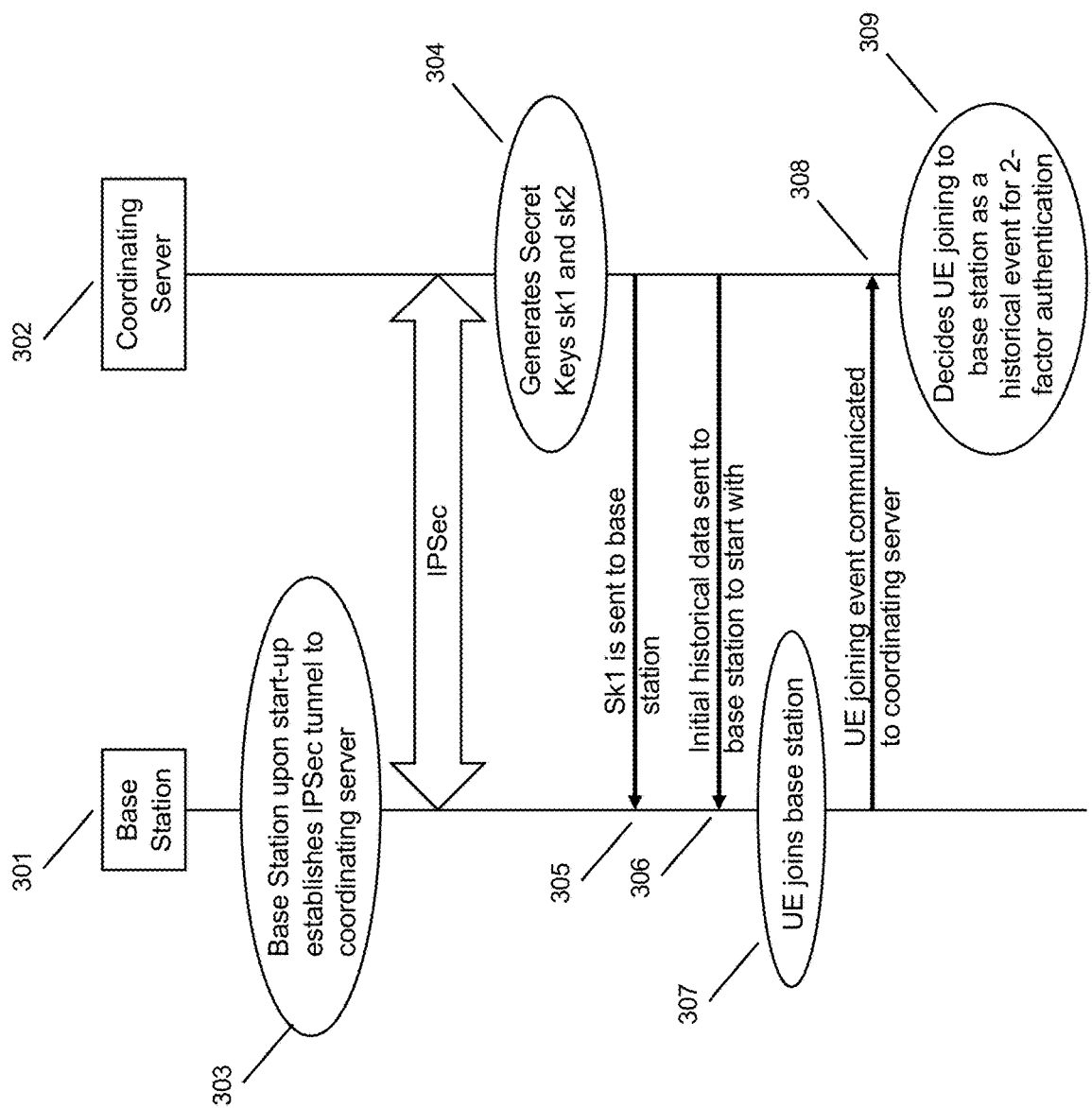
FIG. 3A shows a startup and authentication sequence, in accordance with some embodiments.

FIG. 3A shows a startup and authentication sequence, in accordance with some embodiments. Base station 301 and coordinating server 302 are shown; base station 301 may be a multi-RAT base station and coordinating server 302 is intended to provide services to base station 301, including at least secure configuration and authentication of base station 301, but potentially including other features, e.g., SON, virtualization, proxying, and other functions as described throughout the present disclosures and documents incorporated by reference. At step 303, base station 301 is starting up. Upon startup, the base station attempts to establish a secure tunnel to coordinating server 301, which may be an IPsec tunnel. Establishment of this tunnel is using well-known protocols. At step 304, the coordinating server generates two secret keys sk1 and sk2. At step 305, sk1 is sent to the base station 301, and at step 306, additionally and optionally, initial historical data may be sent to base station 301 to start with. At subsequent step 307, when a UE joins the base station, the joining event is communicated to coordinating server at step 308, and coordinating server at step 309 saves the UE joining event as a historical event for future two-factor authentication.

Figure 3B:
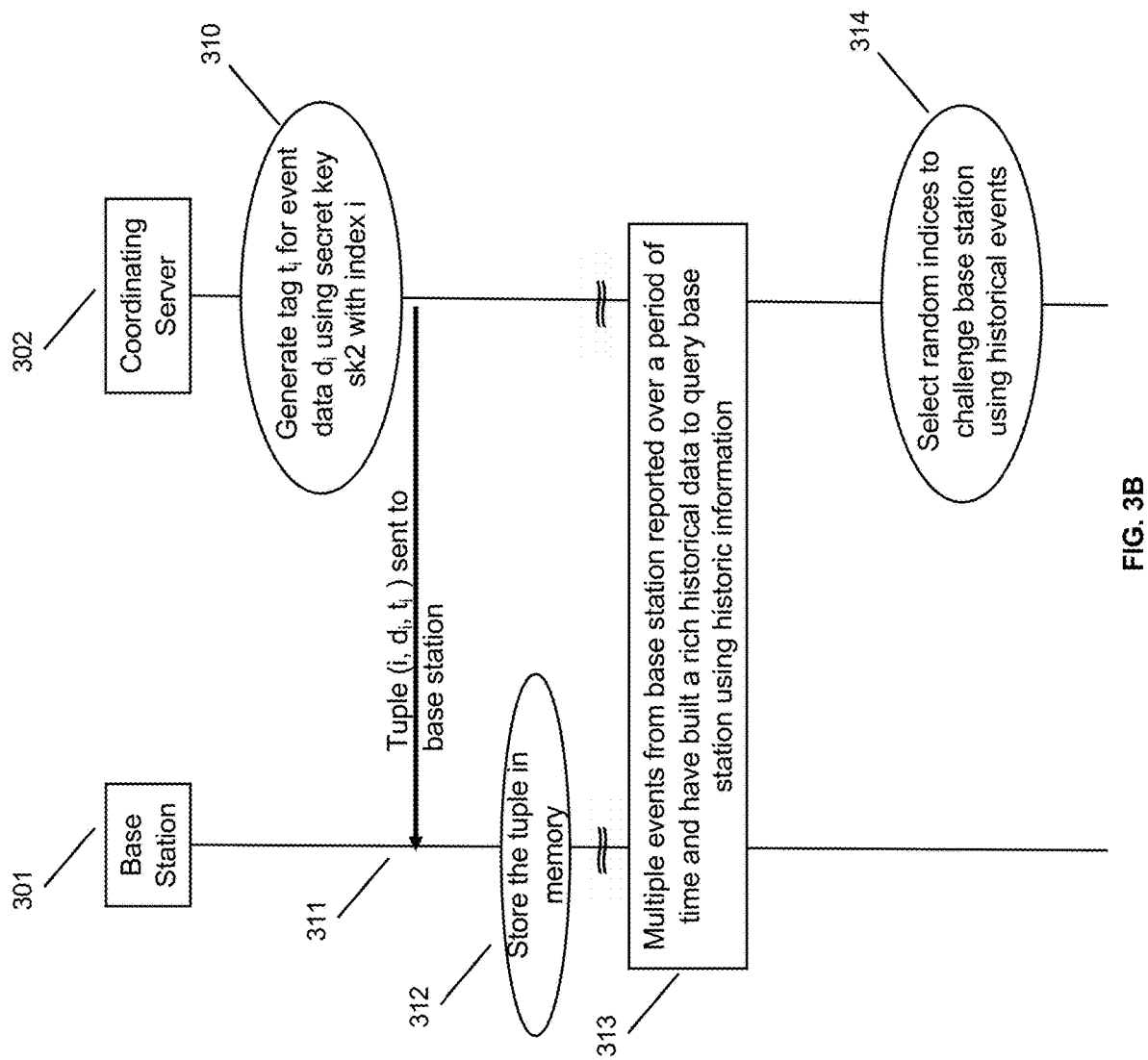
FIG. 3B shows a sequence of events for establishing historical information, in accordance with some embodiments.

FIG. 3B shows a sequence of events for establishing historical information, in accordance with some embodiments. At step 310, the coordinating server 302 generates a tag ti for event data di (for example, the UE attach shown at steps 307-309), and using secret key sk2 with index i. At step 311, tuple i, di, ti based on secret key sk2 (but not secret key sk2) are sent to the base station. At step 312, this tuple is stored in memory. Subsequently, at step 313, multiple events from base station 301 reported over a period of time and have built a rich historical data to query base station using historic information. The coordinating server 302 can now select random indices, at step 314, to challenge base station 301 using historical events in the record. In some embodiments the coordinating server may wait a predetermined period before using recent historical events, in order to increase the difficulty of replay attacks.

Figure 3C:
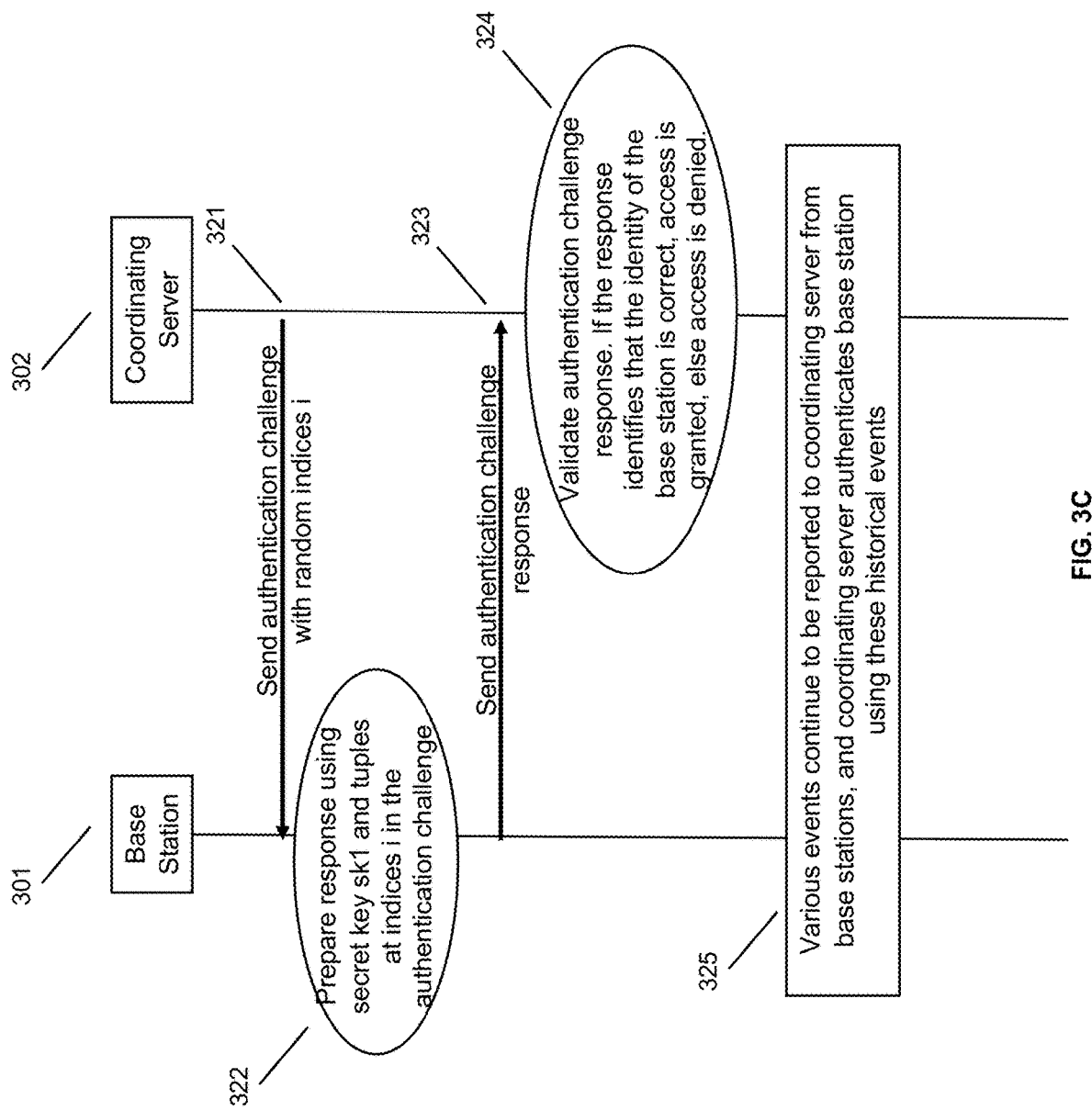
FIG. 3C shows a sequence of events for authenticating using historical information, in accordance with some embodiments.

FIG. 3C shows a sequence of events for authenticating using historical information, in accordance with some embodiments. At step 321, coordinating server 302 sends an authentication challenge using random indices i based on the historical information, as shown at step 314 above, in some embodiments in conjunction with other authentication credentials. Non-random indices, for example, pseudorandom indices or even a fixed set of indices (which still cause the underlying data to vary based on information captured at base station 301) may also be used. At step 322, the base station 301 may prepare a response using secret key sk1 and tuples at indices i from the authentication challenge, each of which are already at the base station. At step 323, a challenge response is sent from base station 301 to coordinating server 302. At step 324, the coordinating server may validate the authentication challenge response. If the response identifies that the identity of the base station is correct, access is granted, else access is denied. At step 325, various events continue to be reported to coordinating server from base stations, and coordinating server authenticates base station using these historical events.

Figure 4A:
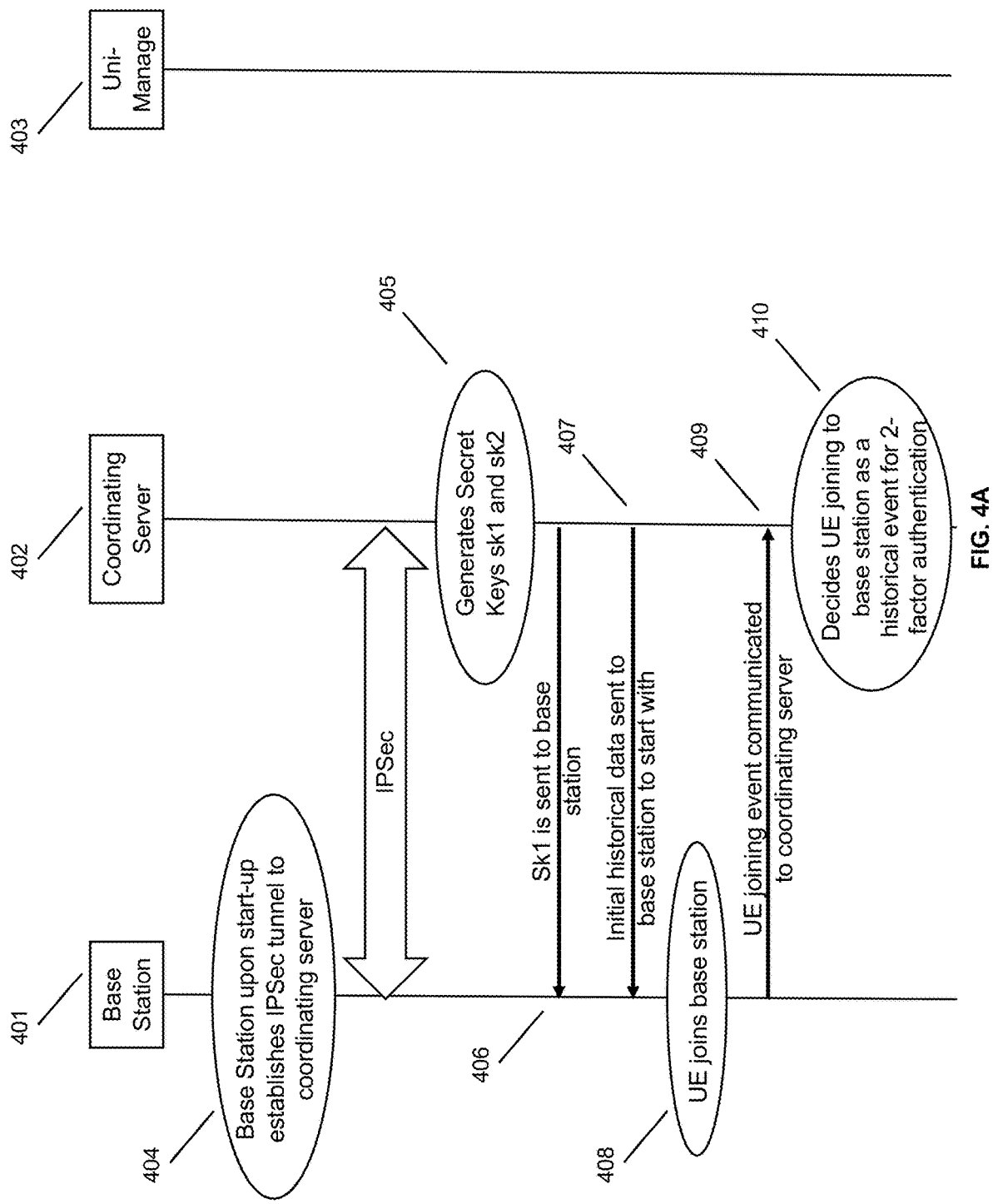
FIG. 4A shows a startup and authentication sequence in conjunction with an entity management system server, in accordance with some embodiments.

FIG. 4A shows a startup and authentication sequence in conjunction with an entity management system server, in accordance with some embodiments. Base station 401, coordinating server 402, and entity management system server 403 (here labeled Uni-Manage) are shown; base station 401 may be a multi-RAT base station; coordinating server 402 is intended to provide services to base station 401, including at least secure configuration and authentication of base station 401, but potentially including other features, e.g., SON, virtualization, proxying, and other functions; and Uni-Manage 403 may be an entity management system tracking and managing all entities in the system, for example licensing information and software/hardware identifiers, as described throughout the present disclosures and documents incorporated by reference. At step 404, base station 401 is starting up. Upon startup, the base station attempts to establish a secure tunnel to coordinating server 401, which may be an IPsec tunnel. Establishment of this tunnel is using well-known protocols. At step 405, the coordinating server generates two secret keys sk1 and sk2. At step 406, sk1 is sent to the base station 401, and at step 407, additionally and optionally, initial historical data may be sent to base station 401 to start with. At subsequent step 408, when a UE joins the base station, the joining event is communicated to coordinating server at step 409, and coordinating server at step 410 saves the UE joining event as a historical event for future two-factor authentication.

Figure 4B:
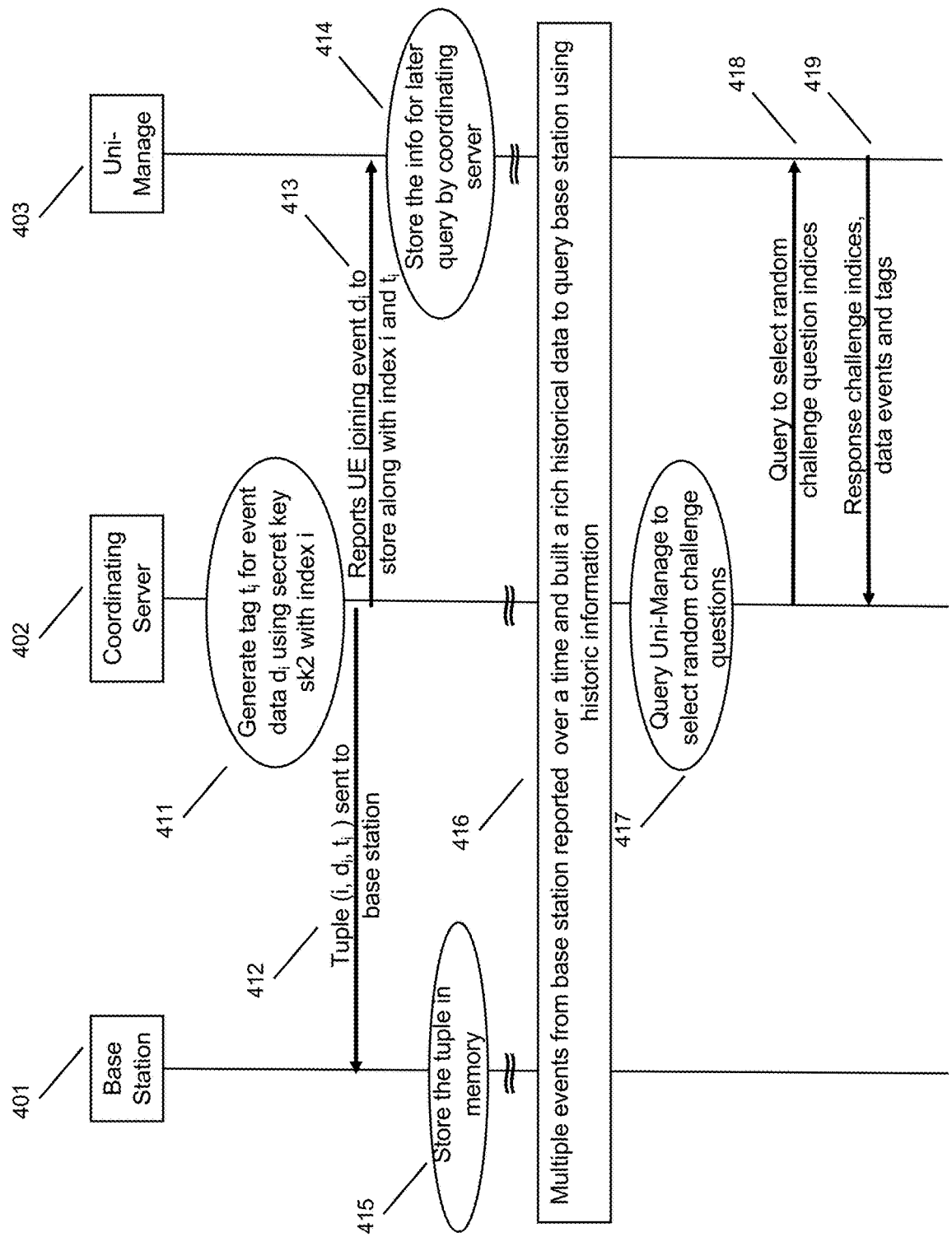
FIG. 4B shows a sequence of events for establishing historical information, in accordance with some embodiments.

FIG. 4B shows a sequence of events for establishing historical information, in accordance with some embodiments. Steps 411, 412, 415 are similar to steps 310, 311, and 312 shown in FIG. 3B. At step 413, coordinating server 402 reports the UE joining event di to the Uni-Manage server 403, along with index i and ti, and server 403 stores the info for later querying at step 414. At step 416, multiple historical events from the base station have been recorded across both coordinating server 402 and Uni-Manage 403. At step 417, the coordinating server queries the Uni-Manage server 403 in order to select random challenge questions, by sending at step 418 a query to select random challenge question indices. At step 419, Uni-Manage 403 responds with challenge indices, data events, and tags. As Uni-Manage server 403 is located in the core network further upstream from coordinating server 402, it is able to store more historical data, in some embodiments, potentially reducing the load on coordinating server 402. In some embodiments the indices may be pruned according to some algorithm known to both base station 401 and Uni-Manage 403, and/or coordinating server 402, to reduce storage burdens on all systems.

Figure 4C:
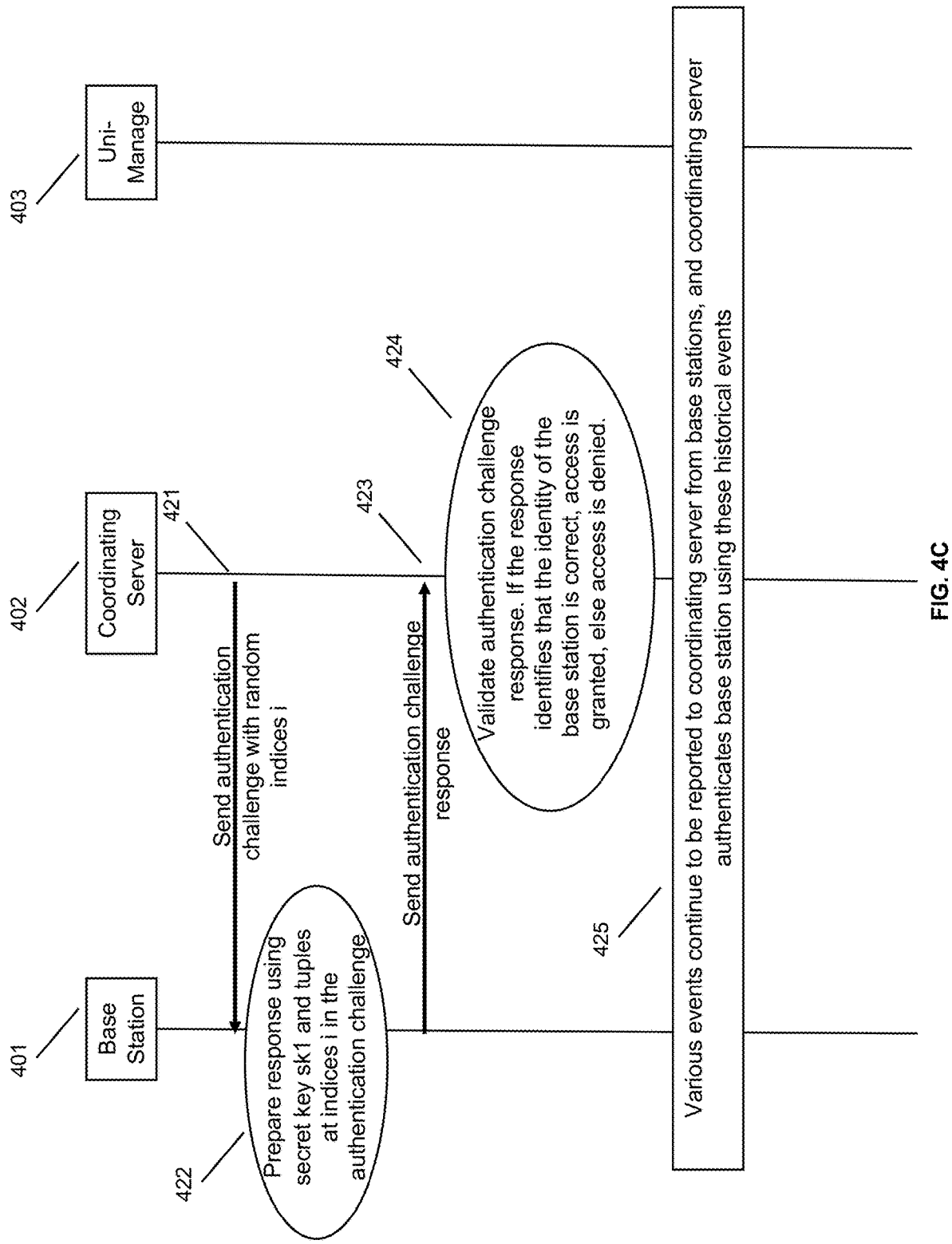
FIG. 4C shows a sequence of events for authenticating using historical information, in accordance with some embodiments.

FIG. 4C shows a sequence of events for authenticating using historical information, in accordance with some embodiments. Steps 421, 422, 423, and 424 are similar to steps 321, 322, 323, and 324 above, respectively. At step 425, various events continue to be reported to coordinating server from base stations, and coordinating server authenticates base station using these historical events; these events are also stored at Uni-Manage 403 and Uni-Manage 403 provides guidance to coordinating server 402 regarding which indices to select for authentication, in some embodiments.

Figure 5:
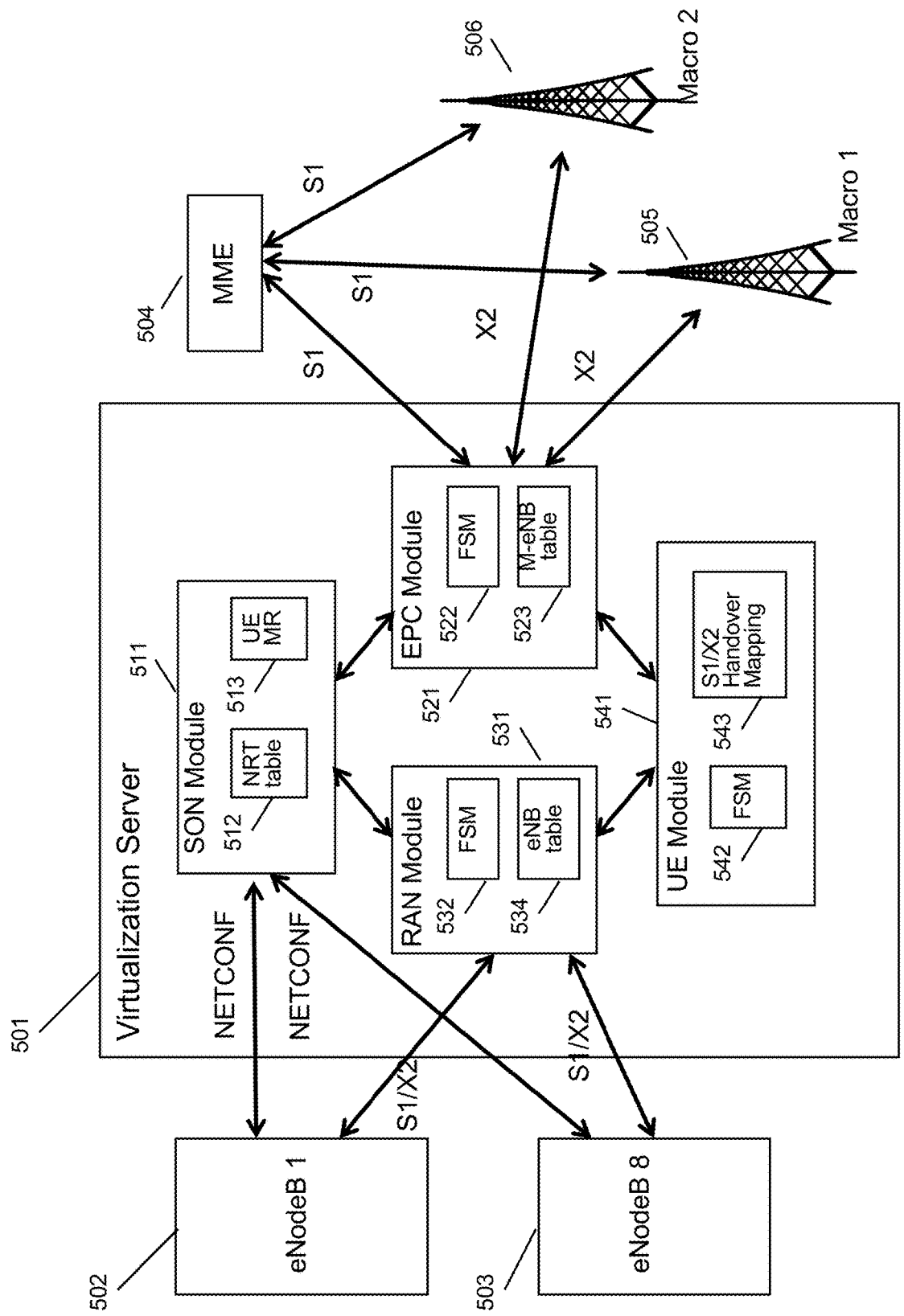
FIG. 5 is a schematic diagram of a base station management gateway in a Long Term Evolution (LTE) architecture, in accordance with some embodiments.

FIG. 5 is a schematic diagram of a base station management gateway in a Long Term Evolution (LTE) architecture, in accordance with some embodiments. Base station management server 501 provides services to, and is coupled to, eNodeB 1 502 and eNodeB 5 503, on a RAN side of a network (i.e., inside of the gateway). Base station management server 501 provides services to, and is coupled to, MME 504, macro eNodeB 505, and macro eNodeB 506, on a core network side of the network (outside of the gateway). Base station management server 501 corresponds to LAC 110, in some embodiments.

Within base station management gateway 501 are self-organizing network (SON) module 511, containing neighbor relation table (NRT) 512 and UE measurement report processing module 513; evolved packet core (EPC) module 521, containing EPC finite state machine module 522 and macro eNodeB table 523; radio access network (RAN) module 531, containing eNodeB finite state machine module 532 and eNodeB table 534; and user equipment (UE) module 541, containing UE finite state machine module 542 and S1/X2 handover mapping table 543. Each of modules 511, 521, 531, and 541 are coupled to each other within base station management gateway 501, and may execute on one or more shared processors (not shown) coupled with memory (not shown).

In some embodiments, SON module 511 may perform NRT maintenance, load information processing and fractional frequency reuse (FFR) processing; RAN module 531 may perform X2 association management with eNodeBs 502, 503; EPC module 521 may perform X2 association management with macro eNodeBs 505, 506; and UE module may perform X2 handover and S1/X2 translation between eNodeBs 502, 503 and macro eNodeBs 505, 506. All the above managers/modules interact with each other to accomplish the assigned functionality.

Figure 6:
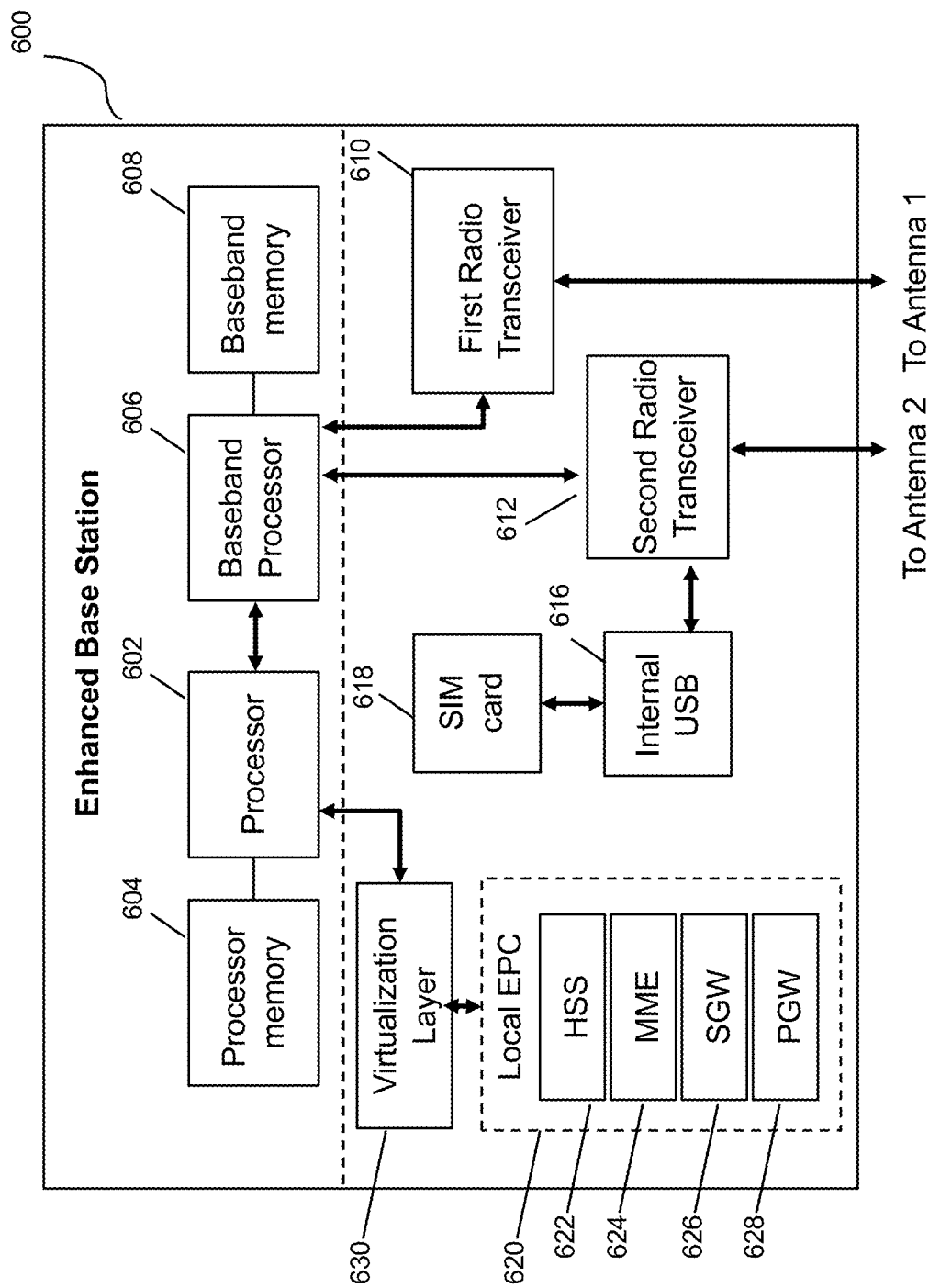
FIG. 6 is a schematic diagram of a mesh network base station, in accordance with some embodiments.

FIG. 6 is a schematic diagram of a mesh network base station, in accordance with some embodiments. Mesh network base station 600 may include processor 602, processor memory 604 in communication with the processor, baseband processor 606, and baseband processor memory 608 in communication with the baseband processor. Base station 600 may also include first radio transceiver 610 and second radio transceiver 612, internal universal serial bus (USB) port 616, and subscriber information module card (SIM card) 618 coupled to USB port 614. In some embodiments, the second radio transceiver 612 itself may be coupled to USB port 616, and communications from the baseband processor may be passed through USB port 616.

A virtualization layer 630 may also be included for mediating communications with an evolved packet core EPC, specifically including the core network EPC (not shown) and local evolved packet core (EPC) module 620. Local EPC 620 may be used for authenticating users and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Virtualization layer 630 and local EPC 620 may each run on processor 602 or on another processor, or may be located within another device.

Processor 602 and baseband processor 606 are in communication with one another. Processor 602 may perform routing functions, and may determine if/when a switch in network configuration is needed. Baseband processor 606 may generate and receive radio signals for both radio transceivers 610 and 612, based on instructions from processor 602. In some embodiments, processors 602 and 606 may be on the same physical logic board. In other embodiments, they may be on separate logic boards.

The first radio transceiver 610 may be a radio transceiver capable of providing LTE eNodeB functionality, and may be capable of higher power and multi-channel OFDMA. The second radio transceiver 612 may be a radio transceiver capable of providing 3GPP WCDMA functionality. Both transceivers 610 and 612 are capable of receiving and transmitting on one or more bands. In some embodiments, transceiver 610 may be capable of providing both LTE eNodeB and LTE UE functionality, and transceiver 612 may be capable of UMTS BTS functionality, UMTS UE functionality, or both. The transceivers may be switched. Transceiver 610 may be coupled to processor 602 via a Peripheral Component Interconnect-Express (PCI-E) bus, and/or via a daughtercard. As transceiver 612 is for providing LTE UE functionality, in effect emulating a user equipment, it may be connected via the same or different PCI-E bus, or by a USB bus, and may also be coupled to SIM card 618.

SIM card 618 may provide information required for authenticating the simulated UE to the evolved packet core (EPC). When no access to an operator EPC is available, local EPC 620 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 610 and 612, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 602 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 610 and 612. Baseband processor 606 may use memory 608 to perform these tasks.

Further Embodiments

Authentication and authorization of the Access Cells using Digital Certificates and PKI System over IPSec describes one-factor authentication that is being enhanced by the disclosure in this document. Also, after one-factor authentication and authorization, a secure tunnel now exists between base stations in radio access networks and the coordination server that appears to the core network as an eNodeB and a core network to the plurality of base stations in the radio access network. First stage authentication (or one-factor authentication) is not limited to the methods disclosed here but could be done by any existent technology such as user-name/password, public/private key pairs, Digital Certificates, Extensible Authentication Protocol using diameter, radius etc.

Interface Between Base Station and Coordinating Server. The coordinating server may send a request message to the base stations using CPE Wan Management Protocol (CWMP) in accordance with TR-069 (Technical Report 069), a technical specification defining an application layer protocol for remote management of devices connected through an Internet Protocol (IP) network. The request message from the coordination server to the base station is an authentication request message, and based on Simple Object Access Protocol (SOAP) over Hypertext Transfer Protocol (HTTP). The request message is used to challenge the base station to answer a specific historical information that only known to the base station.

Events Forming Historical Data. The specific historic information may be a particular alarm event occurred at the base station and the base station reported that to the coordination server, a calibration or adjustment of the radio resource at the base station either upon request from the coordination server or as determined by the base station itself, joining of a user equipment, handoff of a user equipment to other neighboring cell or a macro cell, billing details, Configuration Updates, reporting of signal strength measurement results, mesh links topology at the base station, and/or information that at a broad level can be categorized in alarms and events, inventory management, report and statistics, user management, security, system audit and backup, provisioning, operations and administration management (OAM), call detail recording, etc. The list of information provided here for two-factor authentication of the base station by the coordinating server is not a complete list and may include any information or event, knowledge of which is only with the base station to be verified/authenticated or the coordination server. The challenge question, based on continuously developing events, thus makes it difficult for an hacking device to know a complete detail unless the device is snooping the network for a long time without being detected.

Data Storage and Data Access for the Two-Factor Authentication. The information exchanged between the base station and the coordination server, that may be used for two-factor authentication may be stored at the coordinating server or at a management server such as Uni-Manager using database. The database may be an external database or an in-memory database. The information received from the base station at the coordination server may further be reported to a management server. The management server and the coordination server are communicating over Net-Conf using Simple Network Management Protocol (SNMP). The coordination server may query the management server or access the local database to generate the challenge question to authenticate the base station using two-factor authentication process.

In some embodiments a single factor may be used for authentication, namely, no password but instead just the historical event-based key described herein. In some embodiments, additional factors may be used for multi-factor authentication, such as: hardware fingerprint, hardware IDs such as MAC IDs, other cryptographic keys, pseudorandom numbers, etc.

In some embodiments a plurality of hash algorithms may be provided. The selected hash algorithm may constitute a shared secret. When multiple hash algorithms are available, hiding this may provide an improved level of security. For the period of time used to collect the information, 3 months, 6 months, 1 year, 2 years, or an arbitrary period of time may be used. In some embodiments all data can be saved. In some embodiments only the required data can be saved, by selection of indices. A longer period of time provides greater security. Tradeoff is storage space (not a big increase in CPU processing demand).

In some embodiments TR-069, XML/SOAP may be used for communications, which could be combined with TLS security. New messages added to these protocols could be used. All historical data may be stored in an encrypted manner at both the HNG and the CWS (the authenticator and the authenticatee) to prevent spoofing. The present disclosure may be used to authenticate any node in the RAN or elsewhere in the network.

In some embodiments, there is a period during which data is being collected. After the data is collected, authentication becomes available. Send a message (alert, alarm) to the base station when authentication is available. Prior to this type of authentication becoming available, the RAN node or authenticate node can be set to have extremely limited security privileges ("locked down").

In some embodiments, it may be feasible to repeatedly require authentication (heartbeat authentication) for every period of time. 2FA makes this inexpensive re resources. This also protects against ransomware, e.g., even if an attacker penetrates the RAN node, we have a time window for when the attack occurred.

In some embodiments, both the client and the server can authenticate each other, particularly when both client and server have all the historical data. Other components and nodes in the network can be authenticated ("what happened yesterday?" for any given event and node).

In some embodmients, if a node fails authentication, the system may raise an alarm and/or add to blacklist. (Or, whitelist.) Only take off the blacklist when new IPsec tunnel is reestablished.

Alternatives

It is understood that other configurations of the subject technology will become readily apparent to those skilled in the art from the following detailed description, where various configurations of the subject technology are shown and described with illustration. As will be realized, the subject technology is capable of other and different configurations and its several details are capable of modification in various other aspects, all without departing from the scope of the subject technology. Accordingly, the drawings and detailed descriptions are to be regarded as illustrative in nature and not as restrictive.

In the present disclosure, the words "NodeB" or "eNodeB" are used to refer to a cellular base station. However, one of skill in the art would appreciate that it would be possible to provide the same functionality and services to other types of base stations, specifically to BTSes, non-3GPP base stations, CDMA base stations, CDMA2000 base stations, Wi-Fi access points, and home eNodeBs (HeNodeBs), 5G, as well as any equivalents, and a virtual cell could be created for these other RATs using the same general approach described herein for 4G.

While the present disclosure uses the term "cell," this term is used merely to illustrate the concepts herein, and nothing is implied regarding size, power level etc. for any cells that could be used with the disclosed systems and methods, i.e. "cell" may be interpreted as including macro cells, femto cells, multi-radio access technology (RAT) access nodes, indoor cells, outdoor cells, etc.

Various alternative embodiments are also contemplated by the inventors. For example, certain functions may be performed at a multi-radio access technology node (multi-RAT) node, instead of at a base station management gateway, for example when a base station takes on a management role in a network, or for example when base stations are joined in a mesh network and one or more base stations takes a management role. The base station management gateway may substantially take the form of the described Parallel Wireless HetNet Gateway. The base station management gateway may be a virtualization server. The functions of the base station management gateway may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

The protocols described herein may be optimized for greater or lesser latency, for more or fewer mesh nodes, for more or fewer data streams, and other alternatives. In some embodiments, these optimizations may be performed at the eNodeB, at the base station management gateway, within a function performing radio resource allocation and coding selection, or at another location. In some embodiments, a base station management gateway may identify and initiate power adjustments to improve channel quality.

In some embodiments, the base stations described herein may be compatible with a 3GPP UMTS or Long Term Evolution (LTE) radio transmission protocol or air interface. The LTE-compatible base stations may be eNodeBs. In addition to supporting the 3G WCDMA protocol, the base stations may also support other air interfaces, such as 5G, LTE, UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac/ad/ af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method for authenticating radio access network devices, comprising:
   authenticating, at a coordination server, a base station in a radio access network using a first authentication factor;
   selecting, following successful authentication of the base station using the first authentication factor, a challenge question based on historical information of the base station including continuously developing events stored within a database;
   sending, from the coordination server to the base station, a request containing the challenge question to further authenticate the base station based on the historical information of the base station, wherein the challenge question is based on a first key derived from the historical information;
   receiving, from the base station at the coordination server, a response to the challenge question;
   verifying, at the coordination server, the correctness of the response using a second key derived from the historical information; and
   granting the base station access to a core network of a mobile operator, thereby addressing security issues unsolved by one-factor authentication.

2. The method of claim 1, wherein the historical information further comprises a base station identifier, a timestamp, and an event type.

3. The method of claim 1, wherein the historical information is based on a user equipment (UE) attach event.

4. The method of claim 1, further comprising receiving an index of the historical information at the coordination server from a database server.

5. The method of claim 1, further comprising forwarding, from the coordination server, the historical information to a database server.

6. The method of claim 1, further comprising, at the base station, using an index of the historical information and a local copy of the historical information to derive a secret key at the base station.

7. A non-transitory computer-readable medium which, when executed by a processor at a server, causes the server to perform:
   authenticating, at a coordination server, a base station in a radio access network using a first authentication factor;
   selecting, following successful authentication of the base station using the first authentication factor, a challenge question based on historical information of the base station stored within a database;
   sending, from the coordination server to the base station, a request containing the challenge question to further authenticate the base station based on the historical information of the base station, wherein the challenge question is based on a first key derived from the historical information including continuously developing events;
   receiving, from the base station at the coordination server, a response to the challenge question;
   verifying, at the coordination server, the correctness of the response using the first key derived from the historical information; and
   granting the base station access to a core network of a mobile operator, thereby addressing security issues unsolved by one-factor authentication.

* * * * *